United States Patent [19]

Seibt et al.

[11] 4,148,632
[45] Apr. 10, 1979

[54] TREATMENT OF DISSOLVED BASIC NICKEL CARBONATE TO OBTAIN NICKEL

[75] Inventors: Willie Seibt, Edmonton; Donald R. Weir, Fort Saskatchewan, both of Canada

[73] Assignee: Sherritt Gordon Mines Limited, Toronto, Canada

[21] Appl. No.: 904,659

[22] Filed: May 10, 1978

[30] Foreign Application Priority Data

Nov. 2, 1977 [CA] Canada .................................. 290042

[51] Int. Cl.² ............................................. C22B 23/04
[52] U.S. Cl. .................................. 75/119; 75/0.5 AA; 75/103; 75/108; 423/146; 423/150
[58] Field of Search ................... 75/0.5 AA, 103, 119, 75/108; 423/146, 150

[56] References Cited

U.S. PATENT DOCUMENTS

| | | | |
|---|---|---|---|
| 2,734,821 | 2/1956 | Schaufelberger ...................... | 75/108 |
| 2,836,485 | 5/1958 | Schaufelberger et al. .......... | 75/0.5 A |
| 3,734,721 | 5/1973 | Seibt et al. ........................... | 75/103 X |
| 3,761,250 | 9/1973 | Weir et al. ............................ | 75/108 |
| 3,816,098 | 6/1974 | Mackiw et al. ..................... | 75/119 X |
| 3,928,020 | 12/1975 | Weir ................................. | 423/150 X |

*Primary Examiner*—G. Ozaki

[57] ABSTRACT

A process for recovering nickel from an impure nickel compound which contains a major proportion of nickel values and a minor proportion of other metal values which are relatively soluble in ammoniacal ammonium sulphate solution, and a minor proportion of nickel values and other metal values which are relatively insoluble in the solution. The impure nickel compound is treated with ammoniacal ammonium sulphate solution so that the relatively soluble nickel and other metal values are dissolved in the solution with the relatively soluble nickel values being dissolved substantially as nickel diammine sulphate, and so that the relatively insoluble nickel and other metal values form an undissolved residue. The residue is separated from most of the ammoniacal ammonium sulphate solution so as to provide a substantially residue-free solution of nickel diammine sulphate and relatively soluble other metal values on the one hand and a slurry of the residue of undissolved nickel and other metal values and the solution on the other hand. The substantially residue-free solution is subjected to a reducing operation by hydrogen gas to produce precipitation of elemental nickel powder from the residue-free solution, and the elemental nickel powder is separated from the residue-free solution to produce a first nickel powder product. The slurry is subjected to a reducing operation by hydrogen gas to produce precipitation of elemental nickel powder from the slurry, and the elemental nickel powder is separated from the slurry to produce a second nickel powder product.

8 Claims, 1 Drawing Figure

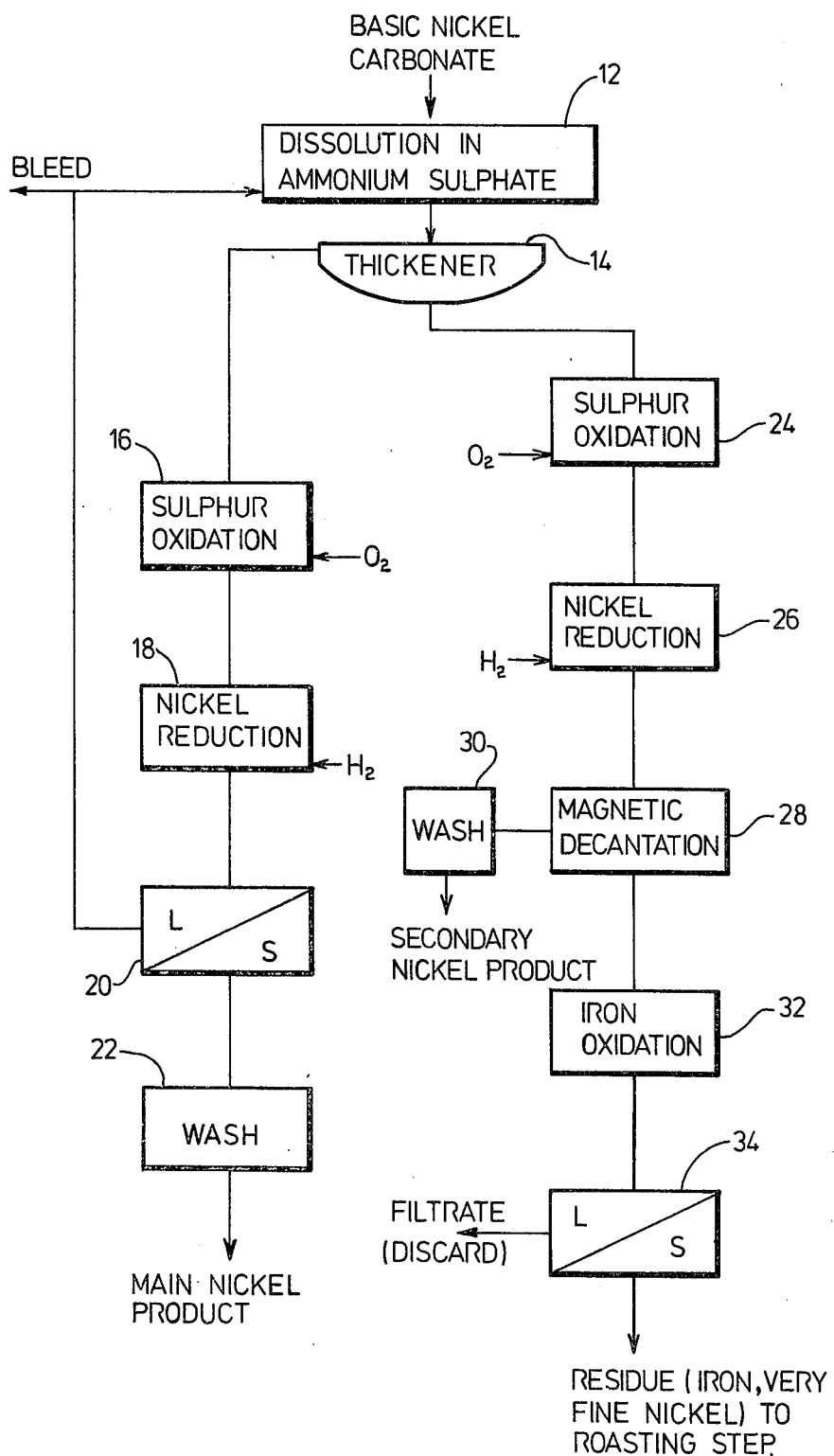

TREATMENT OF DISSOLVED BASIC NICKEL CARBONATE TO OBTAIN NICKEL

This invention relates to the recovery of nickel from impure nickel compounds.

Hydrometallurgical processes for the recovery of metals have, for various reasons, become commercially attractive. Most of the world's nickel supply is obtained from nickel bearing ores which are primarily either oxidic or sulphidic. Processes for treating such ores frequently produce basic nickel carbonate as an impure intermediate product, the basic nickel carbonate being produced from the ore by steps including leaching with ammoniacal ammonium carbonate solution under oxidizing conditions. For example, processes are known in which nickel bearing lateritic (oxidic) ore is treated by first roasting the ore under reducing conditions to selectively convert nickel values in the ore to a form soluble in ammonium carbonate solution, and then leaching the reduced ore with such solution under oxidizing conditions so that the nickel values are dissolved in the solution. Similarly, processes are known in which nickel bearing sulphidic material is roasted, selectively reduced and leached in ammoniacal ammonium carbonate solution. After separation of undissolved residue, nickel values are recovered from the leach liquor in such processes by boiling the solution to drive off ammonia and carbon dioxide and precipitate the dissolved nickel as basic nickel carbonate.

The basic nickel carbonate is usually contaminated with other metal values, for example, iron, manganese, magnesium and zinc. Various procedures involving hydrometallurgical steps have been proposed for obtaining nickel of sufficient purity from the impure basic nickel carbonate. In one known procedure described in U.S. Pat. No. 3,816,098 issued June 11, 1974 to Mackiw et al., the ammonium carbonate leach liquor is first subjected to a cobalt-copper removal step, which may for example comprise reacting the solution with hydrogen sulphide, which results in the removal of a substantial amount of cobalt and copper, with some nickel, as mixed sulphides. After subsequent precipitation of basic nickel carbonate, the precipitate of basic nickel carbonate is separated from the barren liquor, and is then dissolved in ammoniacal ammonium sulphate solution to produce a nickel diammine sulphate solution. A substantial proportion of the remaining contaminating metal values, which may be present, for example as oxides and basic carbonates, do not dissolve in the ammoniacal ammonium sulphate solution. The undissolved residue is separated from the nickel diammine sulphate solution, and the solution is then subjected to an oxidizing step in which sulphur values are oxidized to sulphate form. The oxidized solution is then subjected to a nickel reduction step, from example by use of hydrogen gas, in which the dissolved nickel is reduced and precipitated as elemental nickel.

Under optimum conditions, up to about 98% of the nickel in the basic nickel carbonate is dissolved in the ammoniacal ammonium sulphate solution. The remaining nickel, around 2% of the total, remains in the undissolved residue, and hence is not recovered in the nickel reduction step mentioned above. This remaining nickel does not dissolve in the ammoniacal ammonium sulphate solution probably because it is present in compounds such as nickel hydroxide and/or nickel sulphide, possibly of the refractory type, which are not soluble in ammoniacal ammonium sulphate solution.

In a large nickel reducing plant, such a percentage of unrecovered nickel represents a considerable economic loss. Hence, it would be advantageous if at least some of this nickel could be recovered by comparatively inexpensive procedures.

It has now been found, quite unexpectedly, that a substantial part of the previously unrecovered nickel can be recovered with acceptable purity by subjecting the above mentioned undissolved residue, which remains after the dissolution of the basic nickel carbonate in ammoniacal ammonium sulphate solution, to a hydrogen reduction operation, the residue being present as a slurry with ammoniacal ammonium sulphate solution, which also contains dissolved nickel. In view of the high proportion of contaminating metals to nickel in the residue, it would have been expected that nickel produced in this manner would have been far too impure to be acceptable as a commercial product. This result is also surprising because of the insolubility of the remaining nickel in ammoniacal ammonium sulphate solution. It would not have been expected that the reduction of such a slurry by hydrogen gas would produce a precipitate of elemental nickel of acceptable purity, with a significant amount of nickel in the slurry being so precipitated.

According to the present invention, therefore, an impure nickel compound, which contains a major proportion of nickel values which are soluble in ammoniacal ammonium sulphate solution and a minor proportion of nickel values which, with other metal values, are not soluble in said solution, is treated with ammoniacal ammonium sulphate solution so that the soluble nickel values are dissolved as nickel diammine sulphate, with the insoluble nickel and other metal values forming undissolved residue, the residue is then separated from most of the ammoniacal ammonium sulphate solution so as to provide a substantially residue free nickel diammine sulphate solution on the one hand and a slurry of said residue and said solution on the other hand, the residue free solution is then subjected to a hydrogen reduction operation under conditions of temperature and pressure producing optimum precipitation of elemental nickel from said solution, and the slurry is subjected to a hydrogen reduction operation under conditions of temperature and pressure producing optimum precipitation of elemental nickel from said slurry. In fact, nickel is recovered from both the solid and the liquid components of the slurry.

Before the slurry is subjected to the hydrogen reduction operation, it may be subjected to an oxidation step to oxidize sulphur values in the slurry to sulphate form. Such an oxidizing step improves the purity of the nickel precipitated from the slurry.

After hydrogen reduction of the slurry, the precipitated nickel powder is separated from the reduction end solution and other insoluble matter. Such insoluble matter will probably consist, as previously mentioned, primarily of contaminating metal values in the form of hydroxides, oxides and carbonates. The nickel powder may be separated from the reduction end solution and such insoluble matter by magnetic decantation.

The separated nickel powder should then be washed to remove the remaining reduction end solution. Since the reduction end solution will most likely contain a relatively high iron content, the nickel powder should be washed with a solution which inhibits hydrolysis and consequent precipitation of iron values. For example, the nickel powder may be washed with citric acid solution.

Separation of nickel powder from the reduction end solution by magnetic decantation will probably fail to remove very fine nickel particles, with a size less than 1 micron, and these very fine nickel particles will remain in suspension in the reduction end solution together with the other insoluble matter. At this stage, however, most of the contaminating metal values, such as magnesium, manganese and zinc values, will be dissolved in the solution.

The remaining reduction end solution is then preferably treated to oxidize and consequently precipitate the iron content, for example by sparging air through the slurry. During such oxidation, substantially all the iron can be precipitated, leaving most of the other contaminating metal values in solution.

The residue is then separated from the solution, and consists mainly of iron values and fine nickel powder. Thus, the composition of such residue is suitable for it to be recycled to a convenient step in the main nickel recovery process, for example, to the roasting step.

Thus, with the present invention, very little nickel is not ultimately recovered and, as mentioned earlier, it was surprising that the nickel powder recovered by hydrogen reduction of the slurry was of acceptable purity in view of the fact that at least part of the nickel in the slurry was tied up in compounds which are insoluble in the ammoniacal ammonium sulphate solution.

The final reduction end solution, namely the solution remaining after the separation of the residue of iron values and fine nickel powder, contains most of the contaminating metal values, for example, manganese, magnesium and zinc, in solution.

This remaining solution may therefore be discarded, and may, at least in part, take the place of the bleed which would otherwise be necessary to remove such contaminating metal values from the overall system.

One embodiment of the invention will now be described, by way of example, with reference to the accompanying drawing which shows a flow diagram of the production of nickel powder from basic nickel carbonate.

Referring to the drawing, the starting material is impure basic nickel carbonate which, in commercial practice, will usually have been obtained by leaching reduction roasted nickel bearing lateritic (oxidic) ore. It will be assumed that a copper-cobalt removal step has previously been carried out, such a step being well known in the art and involving, for example, reacting a nickel bearing ammonium carbonate liquor with hydrogen sulphide to precipitate cobalt and copper, with a small amount of nickel, as mixed sulphides.

The basic nickel carbonate to be treated in accordance with the present invention also contains other nickel values, such as nickel sulphide and nickel hydroxide, which may be of the refractoryexample, magnesium, manganese and zinc, as well as iron.

The basic nickel carbonate is first dissolved in ammoniacal ammonium sulphate solution in a dissolution step 12. Most of the nickel is dissolved in the solution as nickel diammine sulphate but, as previously explained, some of the nickel is tied up in relatively insoluble compounds and does not dissolve. Also, some of the contaminating metal values do not dissolve, as they are present as insoluble oxides or basic carbonates.

The resulting solution and undissolved material is then passed to a thickener 14. The overflow from the thickener, which consists primarily of nickel diammine sulphate solution, is passed to a sulphur oxidizing step 16 where the solution is contacted with oxygen gas under conditions of elevated temperature and pressure so as to oxidize sulphur values to sulphate form. In this step, the solution is charged into an autoclave and heated to a temperature in the range of about 65° C. to 260° C., preferably from 175° C. to 230° C., with oxygen being supplied at a partial pressure of at least about 5 pounds per square inch, and preferably in the range of 20 to 50 pounds per square inch. The oxidation step is carried out until substantially all of the sulphur values are oxidized to sulphate form, the time taken generally being from 2 to 20 minutes.

The oxidized solution is then passed to a nickel reduction step 18, in which the solution is charged into an autoclave and reacted with hydrogen gas to reduce nickel in the solution to elemental form. Such a reaction is carried out at a temperature within the range of about 80° C. to 350° C., preferably between 150° C. and 220° C., and with a hydrogen partial pressure of about 100 to about 660 pounds per square inch (psi), preferably about 250–450 psi. The reducing operation is continued until substantially all the dissolved nickel values are reduced and precipitated. However, the reaction is terminated before any remaining cobalt values begin to coprecipitate with and contaminate the elemental nickel product.

The precipitated nickel powder is separated from the solution in a liquids/solids separation step 20 and is washed in a washing step 22. Most of the solution from the liquids/solids separation step 20 is recycled to the dissolution step 12, with a small amount of solution being bled from the system to prevent build-up of contaminants such as manganese, magnesium and zinc.

The above description concerns the production of the main nickel powder product, and the various steps mentioned are generally in accordance with the corresponding steps described in previously mentioned U.S. Pat. No. 3,816,098.

In accordance with the present invention, the underflow slurry from the thickener 14 is also subjected to a nickel extraction procedure. The slurry contains undissolved nickel values and undissolved contaminating metal values, as well as dissolved metal values and dissolved nickel. As previously mentioned, the undissolved nickel is of an amount probably up to 2% of the nickel present in the original nickel ore.

The underflow slurry is preferably first subjected to a sulphur oxidation step 24, although this is not essential. In this step, the slurry is charged into an autoclave, heated to a temperature in the range of from about 65° C. to 260° C. and oxidized by oxygen gas with a partial pressure in the range of from about 20 to 50 psi. This oxidizing step is preferably continued until substantially all the sulphur values are oxidized to sulphate form. The autoclave is equipped with an agitator to ensure that the oxygen gas and slurry are brought into adequate contact with one another.

Prior to the reduction step 26, a small quantity of finely divided nickel powder is added to the slurry as seed, and a small amount of a surface active agent may also be added to aid the reduction operation. The oxidized slurry is then passed to the reduction step 26 which is carried out in an autoclave at a temperature within the range of from about 80° C. to 350° C., preferably between about 150° C. and 220° C., with hydrogen gas being supplied at a partial pressure of about 100–600 psi, preferably about 250–450 psi. The pH of the slurry will be about 8, the actual value being lower if the oxidation step 24 is included than if it is omitted. This reduction step will take approximately 20 minutes. During the reduction operation, the slurry is agitated to ensure adequate contact of the slurry by hydrogen gas.

The reduced slurry is then passed to a magnetically assisted decantation step 28 by means of which most of the precipitated nickel powder is separated by magnetic force from the remaining solids and reduction end solution and thereby caused to settle. The separated nickel powder is then washed in a washing step 30. Owing to the high iron content in the reduction end solution, the separated nickel powder should not be washed by a water wash since this may result in hydrolysis and consequent precipitation of iron. The nickel powder should be washed with a solution which inhibits such hydrolysis, for example citric acid solution.

The washed nickel powder constitutes a secondary nickel product which, in view of the composition of the slurry from which it is produced, is of unexpectedly high quality.

Some of the very fine nickel particles (less than one micron), are not separated from the reduction end solution in the magnetic decantation step 28, and remain with the other undissolved solids in the solution. The solution and undissolved solids are then subjected to an iron oxidation step 32. The oxidation is achieved by sparging air through the slurry, for about 30 minutes, at a temperature of about 80° C. Substantially all the iron can be precipitated in this step, with most of the dissolved contaminating values remaining in solution.

The slurry then undergoes a liquid/solids separation step 34, which may be a filtration step. The solid residue from this step 34 contains most of the iron values and the fine nickel powder. Since a substantial proportion of contaminating metal values, such as magnesium, manganese and zinc values, remain in solution, the residue can advantageously be recycled to some convenient part in the overall nickel recovery process. It was mentioned previously that nickel is commonly obtained from nickel bearing lateritic ore, which is subjected to a reduction roast operation before leaching. In such a process, the residue from the liquid/solids separation step may conveniently be recycled to the roasting operation. The filtrate can be discarded.

Specific examples of the present invention will now be described.

EXAMPLE 1

Underflow slurry from the thickener 14 has the composition shown in Table I.

TABLE I

|  | Solids | Ni | Co | Fe | Mn | Me | Zn | NH$_{3F}$ | NH$_{3F}$/Ni M.R. |
|---|---|---|---|---|---|---|---|---|---|
| Filtrate (gpl) | — | 53.5 | 0.32 | 0.085 | 0.36 | 0.57 | 0.19 | 32 | 2.07 |
| Residue (gpl) | 17.5 | 5.51 | 0.092 | 1.12 | 0.508 | 0.30 | 0.083 | — | — |
| Total (gpl) | 17.3 | 59.01 | 0.412 | 1.205 | 0.868 | 0.87 | 0.273 | — | — |
| Distribution % |  |  |  |  |  |  |  |  |  |
| Filtrate |  | 90.4 | 77.7 | 7.1 | 41.5 | 65.5 | 69.6 |  |  |
| Residue |  | 9.3 | 22.3 | 92.9 | 58.5 | 34.5 | 30.4 |  |  |

The slurry was subjected to an oxidation step 24. A standard autoclave and agitator were used, with the temperature being 204° C. and the oxygen partial pressure being 50 psi. The oxidation step 24 was continued for 30 minutes.

Before the subsequent reduction step 26, 10 grams per liter of nickel powder was added to the slurry as seed, and a small amount of a dilute ammoniated solution of Acrysol A-3 was added as a surface active agent to assist the reduction operation. The temperature was 177° C., the hydrogen partial pressure was 250 psi and the pH was 7.9.

Nickel powder was separated from the reduction end solution by magnetic decantation. Then about 50% of the separated nickel powder was acid washed twice in 5% by volume sulphuric acid, then repulp washed three times with distilled water. The other 50% of the separated nickel powder was repulp washed three times with hot tap water and twice with distilled water.

The remaining solids and reduction end solution were oxidized by sparging air through the slurry at 80° C. for 30 minutes to hydrolyze and consequently precipitate the iron. The residue was filtered off and dried.

Various analyses were carried out during the course of this example and the results are shown in Table 2.

TABLE II

| Product | Vol. (mls) Wt. (g) | pH | Ni | Co | Fe | Mn | Mg | Zn | S$_T$ | C |
|---|---|---|---|---|---|---|---|---|---|---|
| Red. End Sol'n (before Oxidation) | 1860 | 7.9 | 0.424 | 0.186 | 0.370 | 0.776 | 0.800 | 0.220 | — | — |
| Red. end Sol'n (After Oxidation) | 1860 |  | 0.434 | 0.139 | 0.0026 | 0.860 | 0.800 | 0.226 | — | — |
| Residue (filtered from Red. end sol'n) | 18.9 |  | 19.4 | 0.690 | 9.02 | 0.420 | 0.275 | 0.228 | 1.35 | — |
| Ni Powder |  |  |  |  |  |  |  |  |  |  |
| Water Washed | 109.8 |  | — | 0.0936 | 0.212 | 0.0028 | 0.0060 | 0.0045 | 0.0201 | 0.108 |
| Acid Washed |  |  | — | 0.0916 | 0.147 | 0.0015 | 0.0022 | 0.0026 | 0.0156 | 0.113 |
| g Metals |  |  |  |  |  |  |  |  |  |  |
| Solution (after oxidation) |  |  | 0.807 | 0.259 | 0.01 | 1.600 | 1.49 | 0.42 |  |  |
| Residue |  |  | 3.667 | 0.130 | 1.71 | 0.080 | 0.05 | 0.04 |  |  |
| Ni Powder (water washed) |  |  | *91.200 | *0.093 | 0.23 | 0.003 | 0.01 | 0.01 |  |  |
| Total |  |  | 95.674 | 0.482 | 1.95 | 1.683 | 1.55 | 0.47 |  |  |
| Distribution (%) |  |  |  |  |  |  |  |  |  |  |
| Solution |  |  | 0.8 | 53.7 | 0.5 | 95.1 | 96.1 | 89.4 |  |  |
| Residue |  |  | 3.8 | 27.0 | 87.7 | 4.7 | 3.3 | 8.5 |  |  |

TABLE II-continued

| Product | Vol. (mls) Wt. (g) | pH | Ni | Co | Fe | Mn | Mg | Zn | $S_T$ | C |
|---|---|---|---|---|---|---|---|---|---|---|
| Ni Powder | | | 95.3 | 19.2 | 11.8 | 0.2 | 0.6 | 2.1 | | |

In the first section of Table II, the first line shows the composition of the reduction end solution after the reduction step 26 was omitted. The results are shown in Table III which is in the same form as Table II.

TABLE III

| Product | Vol. (mls) Wt. (g) | pH | Ni | Co | Fe | Mn | Mg | Zn | $S_T$ | c |
|---|---|---|---|---|---|---|---|---|---|---|
| Red. End Sol'n (before oxidation) | 1970 | 8.6 | 0.288 | 0.150 | 1.164 | 0.826 | 0.840 | 0.272 | — | — |
| Red. End Sol'n (after oxidation) | 1970 | | 0.431 | 0.111 | 0.011 | 0.790 | 0.875 | 0.256 | — | — |
| Residue (filtered from Red. End Sol'n) | 18.5 | | 24.9 | 0.751 | 8.04 | 1.02 | 0.410 | 0.588 | 3.92 | — |
| Ni Powder water washed | 127.0 | | — | 0.0947 | 0.301 | 0.0059 | 0.0173 | 0.0059 | 3.74 | 0.129 |
| acid washed | | | — | 0.0800 | 0.201 | 0.0021 | 0.0040 | 0.0024 | 4.04 | 0.153 |
| g Metals | | | | | | | | | | |
| Solution (after oxidation) | | | 0.849 | 0.219 | 0.022 | 1.556 | 1.724 | 0.504 | | |
| Residue | | | 4.607 | 0.139 | 1.487 | 0.189 | 0.076 | 0.109 | | |
| Ni Powder (water washed) | | | *107.000 | *0.110 | 0.382 | 0.007 | 0.022 | 0.007 | | |
| Total | | | 111.456 | 0.468 | 1.891 | 1.752 | 1.822 | 0.620 | | |
| Distribution (%) | | | | | | | | | | |
| Solution | | | 0.8 | 46.8 | 1.2 | 88.8 | 94.6 | 81.3 | | |
| Residue | | | 4.1 | 29.7 | 78.6 | 10.8 | 4.2 | 17.6 | | |
| Ni Powder | | | 95.1 | 23.5 | 20.2 | 0.4 | 1.2 | 1.1 | | | magnetic decantation step 28, but before the iron oxidation step 32. The second line shows the composition of the reduction end solution after the liquid/solids separation step 34. The third line shows the composition of the residue obtained in the liquid-solids separation step 34, and the fourth line shows the composition of the separated nickel powder, with the composition for both kinds of wash mentioned above being given.

The second section of Table II shows the amount of various metals in the reduction end solution after the liquid/solids separation step 34, the composition of the residue from the liquid/solids separation step 34, and the composition of the water washed nickel powder obtained in the magnetic decantation step 28. The third section of Table II shows similar information as percentages.

It will be observed that over 95% of the nickel in the underflow slurry from the thickener 14 is removed as secondary nickel powder product, and that nearly 4% of the nickel in the original slurry is present in the residue which can be recycled to the roasting step in the main nickel recovery process.

Only about 0.8% of the nickel in the original slurry is present in the solution after the liquid/solids separation step 34 and, hence, not recovered. If desired however, this nickel could be precipitated, along with any remaining cobalt, as a sulphide by the use of hydrogen sulphide.

It will also be seen that most of the magnesium, manganese and zinc values (over 95%, 96% and 89%, respectively) originally present in the slurry are present in the remaining solution after the liquid/solids separation step 34.

EXAMPLE 2

The procedure of Example 1 was repeated, except that the sulphur oxidation step 24 before the nickel It will be observed by comparison with Table II that omission of the sulphur oxidation step 24 results in more contaminating metal values, and more sulphur, in the secondary nickel powder product and in the residue from the liquid/solids separation step 34.

It has thus been shown that a known nickel recovery process can be improved to increase the percentage of nickel recovered and, at the same time, a substantial amount of contaminating metal values can be eliminated from the overall system. The favourable economics of the process according to the invention will be apparent to the person skilled in the art.

Various alternatives to the described embodiments and specific examples, within the scope of the invention, will be apparent to the person skilled in the art, the scope of the invention being defined in the appended claims.

What we claim as new and desire to protect by Letters Patent of the United States is:

1. A process for recovering nickel from an impure nickel compound which contains a major proportion of nickel values and a minor proportion of other metal values which are relatively soluble in ammoniacal ammonium sulphate solution, and a minor proportion of nickel values and other metal values which are relatively insoluble in said solution, including treating said impure nickel compound with ammoniacal ammonium sulphate solution so that the relatively soluble nickel and other metal values are dissolved in said solution with the relatively soluble nickel values being dissolved substantially as nickel diammine sulphate, and so that the relatively insoluble nickel and other metal values form an undissolved residue, separating the residue from most of the ammoniacal ammonium sulphate solution so as to provide a substantially residue-free solution of nickel diammine sulphate and relatively soluble other metal values on the one hand and a slurry of said residue of undissolved nickel and other metal values and said solution on the other hand, subjecting the substantially residue-free solution to a reducing operation by hydrogen gas to produce precipitation of elemental nickel powder from said residue-free solution, separating said elemental nickel powder from said residue-free solution to produce a first nickel powder product, subjecting said slurry to a reducing operation by hydrogen gas to produce precipitation of elemental nickel powder from said slurry, and separating said elemental nickel powder from said slurry to produce a second nickel powder product.

2. A process according to claim 1 wherein after said second nickel powder product is separated from said slurry, solid residue is separated from said slurry and is recycled to an earlier step in a nickel recovery process.

3. A process according to claim 2 wherein the nickel recovery process includes a roasting operation, and said residue is recycled to said roasting operation.

4. A process according to claim 1 wherein, after separation of said second nickel powder product from said slurry, the slurry is subjected to an iron oxidizing step to precipitate iron from the liquid component of the slurry.

5. A process according to claim 1 wherein said second nickel powder product is separated from the slurry by magnetic decantation.

6. A process according to claim 1 wherein said slurry comprises solid and liquid components and contains iron and at least one of the metals manganese, magnesium and zinc, said solid component of said slurry containing a major proportion of said iron, and said liquid component of said slurry containing substantially all of said at least one metal.

7. A process according to claim 1 wherein said slurry is subjected to a sulphur-oxidizing step, before reduction by hydrogen gas, to convert substantially all sulphur values in the slurry to sulphate form.

8. A process according to claim 1 wherein said impure nickel compound is basic nickel carbonate produced by precipitation after a nickel leaching operation, said basic nickel carbonate containing iron values and values of at least one of the metals magnesium, manganese and zinc, and after said second nickel powder product is separated from said slurry, said slurry comprising solid and liquid components, a major proportion of the iron values being present in the solid component of the slurry and a major proportion of the values of said at least one metal being present in the liquid component of the slurry.

* * * * *